July 24, 1956  E. A. BEILKE  2,755,751
GRAIN DRILL
Filed March 30, 1953
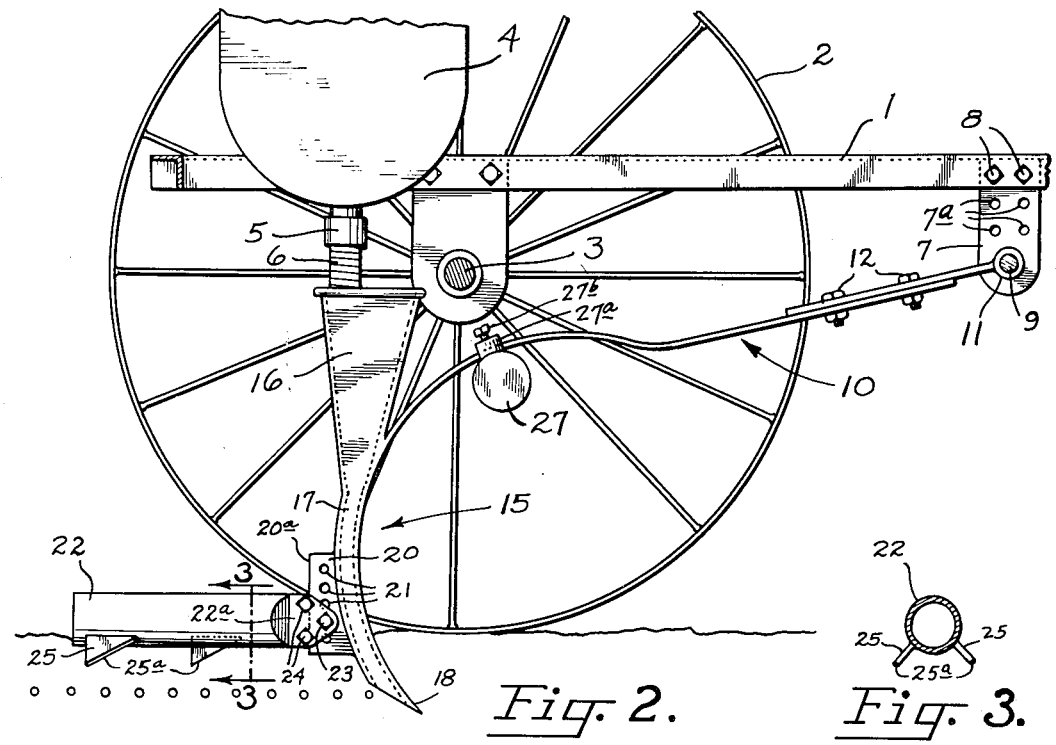
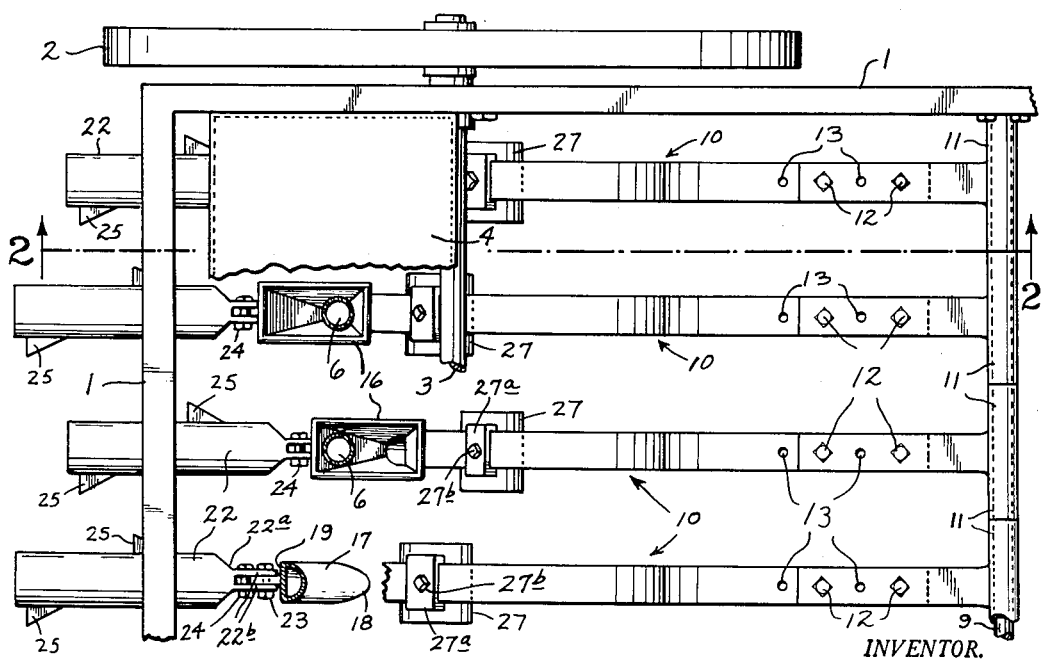
Fig. 1.  Fig. 2.  Fig. 3.
INVENTOR.
Emil A. Beilke
BY
Atty.

2,755,751

GRAIN DRILL

Emil A. Beilke, Pendleton, Oreg.

Application March 30, 1953, Serial No. 345,399

4 Claims. (Cl. 111—84)

The object of my invention is to provide a combination grain drill and depth gauge assembly which may be carried at the trailing end of an elongated spring support similar to that of a spring-tooth harrow, which organization needs neither pressure means from the frame to cause it to run and remain beneath the surface of the soil nor a rider wheel to limit said penetration. That is to say, I incorporate into a combination grain drill and depth gauge the operating advantages of a spring-tooth harrow, together with its formation and springiness. As is well known, a spring-tooth harrow tends to develop "suction"; that is, it has inherent ability to tend to dig in deeper because of its hooked construction. At the same time, due to its springiness, it tends to bend backwardly to flatten said hook and thus ride out of the ground if it strikes an obstruction or if it digs in too deeply. I utilize said suction to cause the furrow point to dig into the ground, but add thereto a depth gauge to the trailing edge of said drill shoe assembly to limit ground penetration of said furrow point.

Said depth gauge performs an additional valuable function. It is only slightly wider than the drill shoe and its furrow point and thus passes through trash covered soil quite easily. Also, it forces soil over the grain being planted and compacts it immediately after the furrow has been made, the seeds drilled in, and before any dry upper soil can fall about the seed and tend to lessen the germinating properties thereof.

A further feature of my invention is that it will plant a uniform depth through hard or soft, sandy or clay soil without further adjustment. This is due to the suction developed by the spring-tooth harrow frame element thereof and the drag-type depth gauge. In heavy soil, the suction will tend to cause the furrow point to dig deeper into the soil until it is resisted by the trailing drag. In light, sandy soil, penetration is held to an optimum depth due to the fact that the broad surface of the drag limits said penetration.

A further object of my invention is to provide a simple structure which presents only narrow furrow points to the soil and plants seed immediately behind said furrow points and immediately firms the soil down over the seed thus planted.

A further object of my invention is to provide a drill shoe assembly which is freely supported beneath the frame of a vehicle and is free to move vertically thereunder. The drill shoe assembly is provided with an open mouth at its upper end and a hollow furrow point at its lower end. Thus, grain being drilled may pass freely from a hopper and seed box through the conventional flexible tube or ribbon into the open mouth without regard to the proximity of the drill shoe assembly to said seed box.

A further object of my invention is to arrange said open upper mouth of the drill or shoe assembly so that the ribbon is free to move therein and to remain unkinked. To this end, I make said open mouth elongated longitudinally of the machine, and thus there is no tendency for said upper end of the drill shoe assembly to kink the flexible tube and inhibit the free flow of grain through the bore of the latter.

A further object of my invention is to provide a drill shoe assembly which may implant seed at an optimum depth in soil having its residual moisture without danger that overlying dry soil will move either from the point associated with the drill or from adjacent ones in a gang to present dry soil adjacent the seed or to cover it to a depth beyond optimum.

Other and further details of my invention are hereinafter described with reference to the accompanying drawings, in which:

Fig. 1 is a fragmentary section of a grain drill mechanism carrying a plurality of drill shoe assemblies embodying my invention and arranged transversely across said vehicle, portions of said vehicle and said drill shoe assembly being shown broken away to disclose the details thereof;

Fig. 2 is a longitudinal section of a grain drill mechanism taken substantially on the line 2—2 in Fig. 1, illustrating the details of a drill shoe assembly embodying my invention, and the associated mechanism for supporting it and for transferring seed from the hopper to a point where it may be implanted in the ground and beneath the surface thereof to an optimum degree; and Fig. 3 is a transverse section through a depth drag portion of my invention, taken on the line 3—3 in Fig. 2.

My invention is illustrated in connection with the pertinent portions of a grain drill mechanism comprising a frame element 1, supported by a wheel 2, and mounted upon an axle 3. It is to be understood that such a structure has a pair of spaced wheels, one at each side thereof, and that there are two frame members extending longitudinally of the machine and at the sides immediately inwardly of the wheels. Extending transversely of said frame is a drill box or hopper 4, having a discharge spout 5 and a flexible tube known as a ribbon extending therefrom.

I have not attempted to show any particular type of lifting device, grain distributing device, and the like, since many varieties of these are common and well known to persons skilled in the art. Although various makes of grain drill mechanisms are manufactured and sold, and their structures vary somewhat, all are wheel-supported frames, preferably drawn by a tractor, and said structures carry drill shoe assemblies at more or less uniform intervals transversely between said pairs of wheels and below said frame member.

Suffice it to say, some distance forward of the axle 3, I arrange a pair of brackets 7, one upon each of the frame members and depending some distance below them. Each of said brackets has a plurality of holes 7a formed therein. These holes are spaced apart vertically and are adapted to receive, selectively, a pair of bolts 8 or other fastening devices. Extending transversely of said vehicle and supported between the two brackets 7 is a bar 9, and journaled on said bar are a plurality of spaced drill shoe assemblies embodying my invention, as is shown in Fig. 1. Each drill shoe assembly comprises a flexible, elastic frame member 10 having an eye 11 at the forward end thereof journaled on bar 9. Said frame member, usually are made in two sections bolted together by bolts 12. One or both of the halves of each frame member is provided with a plurality of holes 13, and securing bolts 12 pass through and join selected pairs thereof. The provision of multiple pairs of holes 13 is to permit overall longitudinal adjustment of the frame member, so that the drill shoe assembly may be adjusted to the particular drill box or hopper under which it is mounted. The trailing half of said frame member 10 is formed to the conventional hook-shaped conformation of a spring-tooth harrow. Said frame members are made of bars of elastic steel, and said bars of steel preferably are much broader than they are thick, as is shown in the figures, so that they will bend vertically quite freely.

Secured to the trailing end of each frame member is an elongated, tubular shoe element 15. At its upper end is a funnel-shaped mouth 16 arranged below the discharge spout 5. As is shown in Figs. 1 and 2, said mouth is of rectangular outline, being longer than its is broad and having a breadth corresponding to the external diameter of the flexible tube or ribbon 6. Thus, as the frame moves up and down about the bar 9 and flexes in the manner of a spring-tooth harrow, it may do so without kinking or crowding said flexible tube to prevent the free flow of grain therethrough and into said elongated, tubular shoe element 15.

The intermediate portion of said shoe element 15 is formed into a conduit which curves to the curvature or sweep of the hook-shaped terminal end of the elastic frame member 10. Preferably, it is formed integrally therewith. In effecting economy of manufacture, however, said conduit 17 may be welded or otherwise secured to a continuous frame member 10 which extends flatwise throughout the length of the shoe element 15 and to the hollow furrow point 18 at the terminal end thereof. In either case, the forward face of said conduit 17 or the forward face of the frame member 10 is curved with its trailing edges receding from the central portion thereof, as is shown in section in Fig. 1. This causes earth being worked to pass readily thereover and prevents trash, particularly surface trash, from hanging up thereon. Thus, the bore of said conduit section of the drill shoe element resembles the capital letter D.

To the flat trailing face 19 of said conduit section, I weld or otherwise secure a flange 20. Said flange lies along a substantial portion of the length of said conduit 17 and stands substantially above the hollow furrow point 18. A plurality of spaced holes 21 are formed therein, and these are used to secure a depth drag 22 directly to said elongated tubular shoe element. A bolt 23 passes through a selected one of the holes 21 and pulls the depth drag along immediately behind said elongated tubular shoe element. In some soils, and particularly in light or sandy soils, it is desirable that said depth drag does not articulate about the bolt 23. To prevent said relative motion, I pass two bolts 24 through the bifurcated forward end 22a of the depth drag 22. Said bolts bear against the trailing edge of the flange 20 and constitute, with the bolt 23, three points of support between the drag and said frame. Thus, no articulation is possible about the bolt 23.

Said depth drag is of elongated, tubular construction, and the pointed end 22a tapers back from the pairs of flanges 22b to merge into the peripheral cross section of said depth drag. On one face of said drag, I provide a plurality of fins or abrading members 25. These have obliquely sloped lower edges 25a, and when the drags are arranged as is shown in Fig. 2, they tend to abrade the ground surface immediately adjacent a row of planted seeds 26. The use of said fins or abrading members is quite important if the soil tends to cake over the row of seeds, as when the soil is wet or if it is liable to be baked out in the hot sun. At other times, it is desirable to rotate said drag 180° about its longitudinal axis and thus arrange said fins or abrading member upwardly, so that they will not affect the surface of the ground. This may be done by removing the bolt 23 and rotating said depth drag. As is shown in Figs. 2 and 3, said fins or abrading members stand out from the periphery of the depth drag at oblique angles. They are arranged as radial extensions of the periphery of said depth drag and should be arranged in mated pairs so that they do not tend to rotate the depth drag to any degree. They also will straddle the row of seeds and thus not uproot or disturb the seeds discharged from the bore of the elongated tubular shoe element immediately behind the hollow furrow point 18.

The lower terminal end of said elongated tubular shoe element terminates in a very acute angle, as is shown in Fig. 2. This is to cause the trailing portion of the hollow bore of the elongated tubular shoe element always to ride above the hollow furrow point 18. Thus, said furrow point will make a furrow in the ground which will be deeper than the emitted grain being planted. In Fig. 2, seed is being planted at about its shallowest depth. If the bolt 23 were passed through the uppermost hole 21, it is obvious that the drag would rotate about the bar 9 and the slope of the terminal end of the tubular shoe element would become more horizontal. The angular slope, as is illustrated in Fig. 2, however, is always so sharp that the trailing edge will always lie above the hollow furrow point adjusted positions.

To aid the frame member 10 in its spring-tooth harrow construction to maintain the optimum depth of seeding, I arrange a weight 27 upon said frame member 10 upon the sickle-like trailing end thereof. Since the frame member 10 is of uniform cross-section, said weight may be adjusted throughout a large portion of its overall length. Depending upon its distance from the bar 9 and its proximity to the shoe element 15, it will vary the effective mass, tending to cause the furrow point 18 to work downwardly into the ground. Said weight is provided with a tunnel 27a for circling the frame member 10, and a set screw 27b fixes it in place.

The operation of my invention is as follows:

The elastic frame members are first adjusted for proper length by setting the bolts 12 in selected holes 13. It is necessary not only to adjust these frame members to a particular machine, but also to stagger them alternately, as is shown in Fig. 1. Thereafter, the amount of suction is determined and the brackets 7 are secured in position to locate the bar 9 at its proper height below the frame element 1. Then the weight 27 is adjusted longitudinally of the frame members with respect to the ground which is to be worked. The depth drag 22 is then adjusted, taking into consideration the moisture level, the time of the year and other factors controlling the expected sprouting of said grain.

My invention is particularly useful in planting winter wheat when the planting time is held back by dryness of the soil. In the Eastern Oregon country, with which I am familiar, it is the practice to hold back planting until the middle of September or the first of October, depending upon ground conditions. It is essential, or at least desirable, that said seed wheat be planted so that it will sprout in about one week's time, and, to produce such expected growth, it is necessary that the seed be planted in moist soil and not so deeply that it has difficulty in growing through the overburden. I have found that if a grain drill embodying my invention is used, grain may be planted several weeks earlier, because the elongated tubular shoe element can be made quite narrow and does not disturb the ground as much as disks and other types of planting elements. If seed is discharged from said shoe element and immediately compacted by the depth drag, there is no possibility of dry soil falling down upon the seed, and the seed remains in moist soil and the earth is immediately firmed down over said seed. The proximity of said drag to the shoe element also prevents earth from other shoe elements in a gang being inadvertently spilled over a row of seed.

The lateral discharge of soil from one row to another is particularly troublesome in light soil and upon side hills. If said soil does tend to shift laterally, it will flow over the trailing, tubular depth drag and will not lie in the furrow formed thereby. The compaction of the earth by the depth drag also tends to retain the moisture therein and to prevent winds from blowing it way. Early planting tends to promote good substantial root growth before the fall rains set in, and said root growth tends to hold the soil together to prevent heavy fall rains from cutting rivulets and wetting the seeded ground. I have also found that I am required to plant only about one-half the amount of seed with a drill embodying my invention as I would have to use with those conventional drills with which I am familiar. I ascribe this to the fact that the seed is always arranged in rows of optimum depth and in moist ground firmly compacted by the depth drag. The absence of depth wheels and other accessory equipment tends to prevent trash from being pulled along by the drill. This is important not only because dragged trash disturbs the soil, but also because said trash frequently becomes so entangled that it requires the operator to stop, back up, and clean out said trash. Also, trashy ground cannot be drilled with disk-type drills because they tend to run over the trash and proper penetration is not secured.

I deem it of substantial importance to provide the suction of a spring-tooth harrow type frame and a trailing depth gauge, because the suction of said sickle-like frame and the drag limiting penetration adapts a drill embodying my invention to any type of soil, slope, seed grain, or weather condition. The narrowness of the elongated, tubular shoe elements 15 and the depth drag associated therewith tends to make furrows of narrow width and of substantial depth. This provides relatively high, lateral shoulders, which are important to shield the rows of seed from the hot sun and, also, to tend to retain moisture in said furrows, over said seed, and also to entrap any rain.

It is characteristic of the action of a grain drill embodying my invention that it vibrates very rapidly, vertically, underneath the frame. It looks alive rather than quiet, and said rapid vibration, due to the flexibility and elasticity of the frame, the pivotal action of the forward end thereof, and the springiness of the sickle-like trailing end thereof, tends to cause it continually to move up and down. This causes any dirt which might clog the terminal end to be shaken free, and also tends to shake off any surface trash which might otherwise become entangled therewith.

I claim:

1. In combination, an elongated spring tooth harrow blade mounted for vertical movement about one end thereof, said blade including an elongated tubular drill shoe which terminates adjacent the furrow point free end of said spring tooth harrow blade, a horizontally disposed tubular depth drag extending rearwardly of said furrow point free end, and adjustable mounting means fixedly interconnecting said drill shoe and the depth drag immediately behind and slightly above said furrow point free end to prevent relative movement therebetween.

2. In combination, a frame member, a spring tooth harrow blade pivotally mounted upon said frame member, said spring tooth harrow blade including an elongated tubular drill shoe which terminates adjacent the furrow point free end of the spring tooth harrow blade, and horizontally extending tubular depth drag means fixedly mounted upon said drill shoe at a point immediately behind and slightly above said furrow point free end, said depth drag having a tapered forward end followed by a tubular body from which a plurality of abrading members protrude.

3. A grain drill mechanism, comprising a spring tooth harrow blade including an elongated drill shoe which terminates substantially at the furrow point free end of said spring tooth harrow blade, a horizontally disposed tubular depth drag extending rearwardly of said free end, said depth drag having a tapered forward end followed by a tubular body from the lower half of which a plurality of oblique abrading members protrude, each said abrading member being arranged on a radial extension of the periphery of said tubular body, and adjustable mounting means fixedly interconnecting said drill shoe and depth drag immediately behind and slightly above said furrow point free end to prevent relative movement therebetween.

4. A drill shoe assembly comprising an elongated spring tooth harrow blade mounted at one end for flexibility and freedom of movement about that end in a vertical direction, said spring tooth harrow blade including an elongated tubular shoe element rearwardly of the trailing end of the tooth, said trailing end constituting a furrow point for the harrow blade, and a depth drag secured by mounting means to said drill shoe assembly and trailing it immediately above said furrow point, said depth drag being slightly wider than said furrow point, said mounting means constraining said depth drag against articulation to ride in part below the surface of the ground immediately following said furrow point.

References Cited in the file of this patent

UNITED STATES PATENTS

| Number | Name | Date |
|---|---|---|
| 120,423 | Earlywine | Oct. 31, 1871 |
| 203,207 | Springer | Apr. 30, 1878 |
| 220,526 | Gardiner | Oct. 14, 1879 |
| 225,640 | Prewitt | Mar. 16, 1880 |
| 294,791 | La Dow | Mar. 11, 1884 |
| 323,953 | Outram | Aug. 11, 1885 |
| 335,468 | McLain | Feb. 2, 1886 |
| 402,677 | Lathrop | May 7, 1889 |
| 410,064 | Arnett | Aug. 27, 1889 |
| 474,430 | Wells | May 10, 1892 |
| 486,637 | Fender et al. | Nov. 22, 1892 |
| 490,833 | Muir | Jan. 31, 1893 |
| 889,947 | Miller | June 9, 1908 |
| 1,104,602 | Akers | July 21, 1914 |
| 1,272,466 | Larson | July 16, 1918 |
| 2,658,463 | Jaeger | Nov. 10, 1953 |
| 2,659,289 | Holman | Nov. 17, 1953 |

FOREIGN PATENTS

| Number | Country | Date |
|---|---|---|
| 277,201 | Germany | July 29, 1914 |
| 26,598 | Norway | Jan. 24, 1916 |